3,320,228
SOLIDS TRANSFER
Dale E. Bradford, Pasadena, Tex., assignor to Phillips
Petroleum Company, a corporation of Delaware
Filed July 23, 1963, Ser. No. 297,055
5 Claims. (Cl. 260—94.9)

This invention relates to the transfer of solid particles from a first liquid into a second liquid. In another aspect it relates to the recovery of polymer fines.

In various chemical operations, slurries of finely divided solids are produced. The recovery of these solids, while desirable, is not economically justified in many processes. For example, in the production of olefin polymers, the resulting polymer can be recovered from the reactor effluent by precipitation and stripping procedures which introduce water into the system. This usually results in a waste water stream which contains finely divided polymer in suspension. The recovery of these polymer fines is desirable if such recovery can be carried out economically.

In accordance with this invention, a procedure is provided for transferring solid particles suspended in a first liquid into a second liquid from which the particles can more readily be recovered. For example, a slurry of polymer fines in water can be processed to transfer the fines into a hydrocarbon in which the polymer is soluble at elevated temperatures. A two-phase system is provided in a treating vessel. In the recovery of polymer fines, the lower phase comprises water, and the upper phase comprises an organic material. A slurry of polymer and water in introduced into the treating vessel at approximately the interface between the two phases. The polymer, which has a density less than that of water,, rises to the interface. The organic phase is normally agitated so that the polymer is entrained therein and can be removed from the treating vessel with the organic material. In some operations, the organic material can be maintained at a temperature which is sufficiently high to dissolve the polymer.

Accordingly, it is an object of this invention to provide a method of recovering solid particles suspended in a liquid.

Another object is to provide a method of transferring solid particles from a first liquid into a second liquid which is substantially immiscible with the first liquid.

A further object is to provide a procedure for recovering polymer fines which are suspended in water.

A further object is to provide apparatus for use in transferring solid particles from a first liquid to a second liquid.

Other objects, advantages and features of the invention should become apparent from the following detailed description, taken in conjunction with the accompanying drawing in which.

Figure 1:
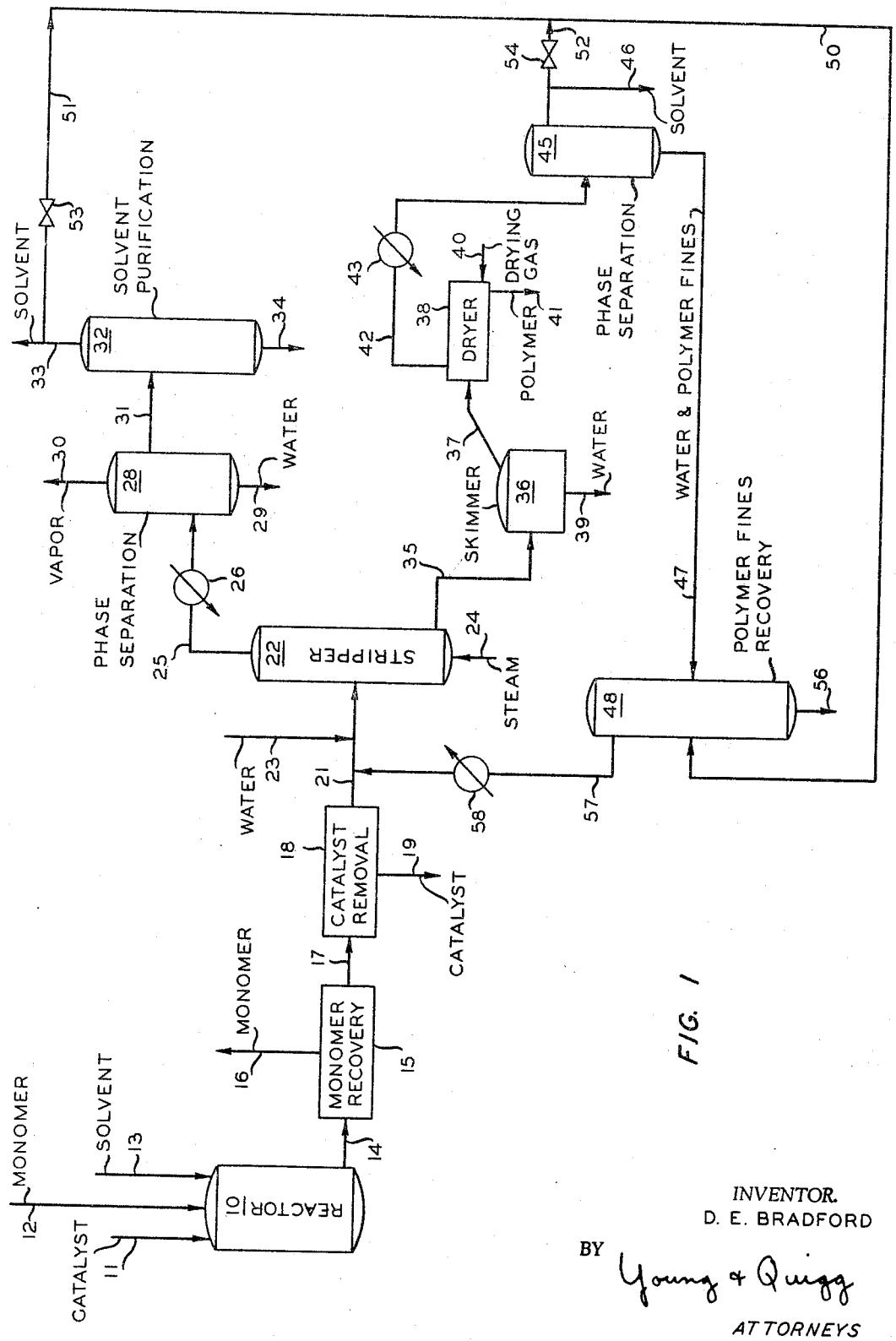
FIGURE 1 is a schematic representation of a polymer producing and recovery system having the present invention incorporated therein.

The solid transfer system of this invention is particularly useful in the recovery of polymer fines which often result in the production and recovery of olefin polymers. A process of this type is illustrated schematically in FIGURE 1. Catalyst, monomer and solvent are introduced into a reactor 10 through respective conduits 11, 12 and 13. In the polymerization of olefins, such as ethylene, the reaction is commonly carried out in the presence of a hydrocarbon solvent or diluent, such as cyclohexane. The reactor effluent is directed through a conduit 14 to a monomer recovery zone 15. Any unreacted monomer is normally flashed off and removed through a conduit 16. The effluent from recovery zone 15 is conveyed by a conduit 17 to a catalyst removal zone 18. The catalyst particles are therein removed by means of a suitable filter or a centrifuge, and are conveyed from the removal zone by means of a conveyor 19. The effluent from zone 18, which comprises primarily polymer and solvent, is transported by a conduit 21 to a stripping zone 22. Cool water is introduced into conduit 21 by means of a conduit 23 to lower the temperature sufficiently to precipitate the polymer from the solvent.

The temperature of stripping zone 22 is elevated, such as by the introduction of steam through a conduit 24, to vaporize the solvent present in the system. This vaporized solvent is removed through an overhead conduit 25 which has a condenser 26 therein. The temperature of the overhead stream from stripping zone 22 is lowered by condenser 26 so that most of the steam and solvent are introduced into a phase separation zone 28 in the liquid state. Water is removed from the bottom of zone 28 through a conduit 29. Any remaining vapor is removed from the top of zone 28 through a vent conduit 30. The liquid solvent, which may conttain some polymer fines in suspension, is removed from an intermediate region of zone 28 through a conduit 31 which communicates with a solvent purification column 32. Purified solvent is removed from the top of column 32 through a conduit 33. A major portion of this solvent can be returned to reactor 10 by a conduit, not shown, if desired. Impurities are discharged from column 32 through a conduit 34.

A slurry of water and polymer is removed from stripping zone 22 through a conduit 35 which communicates with a polymer skimmer 36. The polymer, which has a density less than that of water, floats to the surface in skimmer 36 and is removed through a conveyor 37 which communicates with the inlet of a dryer 38. Waste water is discharged from skimmer 36 through a conduit 39. A drying gas at an elevated temperature is introduced into dryer 38 through a conduit 40. The dried polymer is discharged through a conveyor 41. The effluent gas from dryer 38, which contains water vapor and polymer fines, is removed through a conduit 42 which has a condenser 43 therein. The resulting cooled material is transferred to a phase separation zone 45. Any condensed solvent which may remain in the system is removed from the upper region of zone 45 through a conduit 46. A slurry of water and polymer fines is removed from the lower region of phase separator 45 through a conduit 47 which communicates with an intermediate region of a polymer fines recovery vessel 48.

A stream of solvent is introduced into vessel 48 by means of a conduit 50. Conduit 50 is supplied with solvent from either or both of conduits 51 and 52. Conduits 51 and 52, which have respective valves 53 and 54 therein, communicate with respective conduits 33 and 46. The polymer fines are transferred within vessel 48 from the water into the solvent by the procedure described hereinafter in detail. A waste water stream is removed from the bottom of the vessel 48 through a conduit 56. A solvent stream containing the polymer fines is removed from the upper region of vessel 48 through a conduit 57 which communicates with conduit 21. A heater 58 is provided in conduit 57 so that the solvent is elevated in temperature before being introduced into stripper 22.

Figure 2:
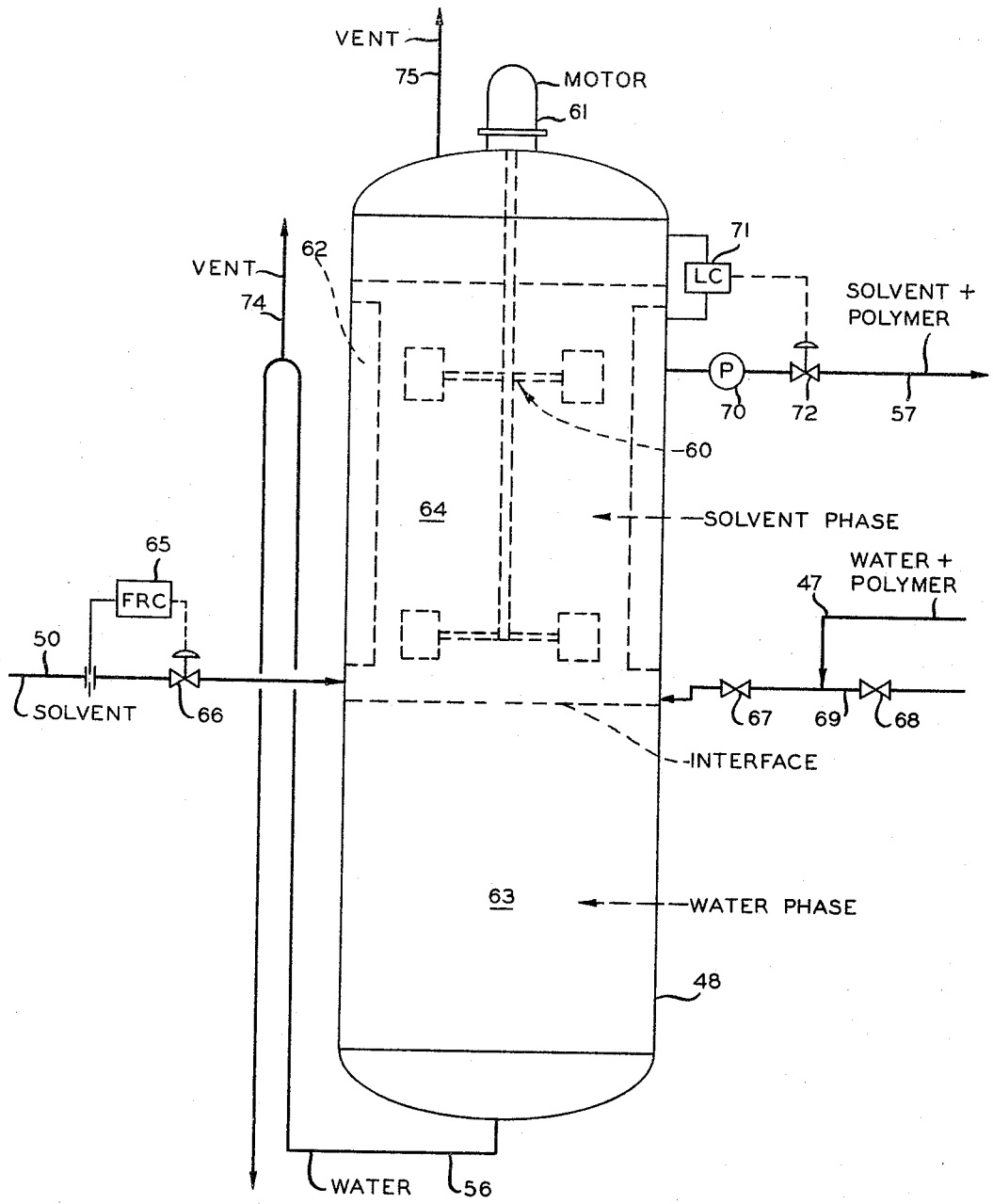
FIGURE 2 illustrates an embodiment of the apparatus of this invention which is incorporated in the polymer recovery system of FIGURE 1.

Polymer fines recovery vessel 48 is illustrated in detail in FIGURE 2. The vessel is provided with a stirrer 60 in the upper region. Stirrer 60 is rotated by a motor 61. Vanes 62 can be provided in the upper side wall of the vessel to facilitate the agitation of the material in the upper region of the vessel. The stirrer assembly is rotated at a relatively low speed so that the material in the upper region of vessel 48 is swirled gently rather than being agitated vigorously. In operation, a water phase 63 is formed in the lower region of vessel 48, and a solvent phase 64 is formed in the upper region. Solvent is introduced into the upper region of vessel 48 through conduit 50 at a predetermined rate which is maintained by a flow controller 65 which adjusts a valve 66. The slurry of water plus polymer fines is introduced through conduit 47 at or near the interface within vessel 48. A valve 67 is provided in conduit 47 to permit the flow to be adjusted as required. A valve 68 in a vent conduit 69 permits the stream to be diverted from the treating vessel, if desired. The polymer fines introduced into vessel 48 tend to float on the water phase so that they accumulate at the interface. The solvent phase is agitated gently so that the polymer fines become entrained in the solvent and are removed through conduit 57 with the solvent. A pump 70 is provided in outlet conduit 57. The rate of flow through this conduit is adjusted by liquid level controller 71 which regulates a valve 72 to maintain a predetermined level in vessel 48. Water is removed from vessel 48 through conduit 56 which is the form of an overflow weir. The top of the loop of the weir is provided with a vent conduit 74. The top of vessel 48 is also provided with a vent conduit 75. This weir overflow system tends to maintain the interface at a constant height within vessel 48.

In one specific embodiment of this invention, a slurry of polyethylene fines in water enters vessel 48 at the rate of approximately 5 gallons per minute and at a temperature of 120° F. The water contains from 1 to 2% polymer fines, by weight, which fines will pass through a 10 mesh sieve. Cyclohexane at 110° F. is circulated through vessel 48 at the rate of 5 gallons per minute. The water removed through conduit 56 is substantially free of the polymer fines.

In some operations, it is possible to transfer solid particles from a slurry in a first liquid into a solution of a second liquid. This can be accomplished whenever the nature of the particles and the second liquid is such that the particles dissolve in the second liquid at the operating temperature. In the polymer recovery system previously described, the polymer fines will dissolve in cyclohexane at elevated temperatures.

While this invention has been described in conjunction with a presently preferred embodiment, it should be evident that it is not limited thereto.

What is claimed is:

1. The method of transferring solid particles suspended in a first liquid into a second liquid which is substantially immiscible with the first liquid and which has a lower density than the first liquid, said particles having a lower density than the first liquid, which comprises positioning quantities of the first and second liquids in a confined zone to form separate phases, agitating the second liquid phase to entrain solid particles therein, and introducing additional first liquid containing such solid particles suspended therein into said zone in sufficiently close proximity to the interface between the two liquids so that the solid particles accumulate at the interface and are then entrained by the agitated second liquid.

2. The method of claim 1 wherein said particles are olefin polymer, said first liquid is water, and said second liquid is a normally liquid hydrocarbon.

3. The method of transferring solid particles suspended in a first liquid into a second liquid which is substantially immiscible with the first liquid and which has a lower density that the first liquid, said particles having a lower density than the first liquid, which comprises positioning quantities of the first and second liquids in a confined zone to form separate phases, stirring the second liquid zone to entrain solid particles, introducing additional first liquid containing such solid particles suspended therein inito said zone substantially at the interface between the two liquids so that the solid particles accumulate at the interface and are entrained in the stirred second liquid, by the stirring action, withdrawing first liquid having particles removed therefrom from said zone at substantially the same rate as the first liquid is introduced into said zone, introducing second liquid into said zone, and withdrawing second liquid containing particles from said zone at substantially the same rate as the second liquid is introduced into the zone.

4. The method of claim 1 wherein the particles are soluble in the second liquid and the first liquid containing the solid particles is introduced into the zone within the second liquid phase in close proximity to but above the interface.

5. The method of transferring solid polymer particles suspended in a first liquid into a second liquid which is substantially immiscible with the first liquid and in which the particles are soluble which comprises positioning a quantity of the first liquid in a confined zone, positioning a quantity of the second liquid in the confined zone above the first liquid to form separate phases of the two liquids in the zone, stirring the second liquid to entrain solid particles therein, introducing additional first liquid containing such solid particles suspended therein into said zone substantially at but slightly above the interface between the two liquids so that the solid particles enter the stirred second liquid and are entrained therein by the stirring action and then dissolved therein, and withdrawing first liquid having particles removed therefrom from said zone at a rate sufficient to maintain the interface at substantially the same location in the zone.

References Cited by the Examiner
UNITED STATES PATENTS

| | | | |
|---|---|---|---|
| 1,839,117 | 12/1931 | Nagelvoort | 209—172 |
| 2,686,592 | 8/1954 | Miller | 209—163 |
| 3,080,354 | 3/1963 | Moon | 260—94.9 |
| 3,090,774 | 5/1963 | Scoggin | 260—94.9 |

JOSEPH L. SCHOFER, *Primary Examiner.*

F. L. DENSON, *Assistant Examiner.*